United States Patent [19]

Matsumoto et al.

[11] Patent Number: 5,335,601
[45] Date of Patent: Aug. 9, 1994

[54] AUTOMATIC ARTICLE TRANSPORT FOR BUILDING SYSTEM WITH CENTRALIZED ROUTING CONTROL

[75] Inventors: Takeji Matsumoto; Noboru Oyamada; Michinori Kiritani, all of Hiroshima; Teruo Fukunaga, Tokyo; Yoshio Abe, Tokyo; Hiroshi Kondoh, Tokyo, all of Japan

[73] Assignees: Mitsubishi Heavy Industries, Ltd.; Shimizu Construction Co., Ltd., both of Tokyo, Japan

[21] Appl. No.: 26,301

[22] Filed: Mar. 4, 1993

[30] Foreign Application Priority Data

Aug. 24, 1992 [JP] Japan .................................. 4-223924

[51] Int. Cl.$^5$ .............................................. B61J 1/00
[52] U.S. Cl. ..................................... 104/88 R; 104/91; 364/478
[58] Field of Search .................. 104/88, 91, 98; 364/424.02, 424.07, 474.2, 478

[56] References Cited

U.S. PATENT DOCUMENTS

| | | | |
|---|---|---|---|
| 3,255,897 | 6/1966 | Lucy et al. | 104/91 X |
| 3,472,175 | 10/1969 | Carder et al. | 104/91 |
| 3,783,792 | 1/1974 | Cullom | 104/98 X |
| 4,630,216 | 12/1986 | Tyler et al. | 104/88 X |
| 4,750,429 | 6/1988 | Mordaunt et al. | 104/91 X |
| 5,080,019 | 1/1992 | Takemura et al. | 104/88 |

FOREIGN PATENT DOCUMENTS 2972  1/1977  Japan .................................. 104/88

Primary Examiner—Robert J. Oberleitner
Assistant Examiner—S. Joseph Morano
Attorney, Agent, or Firm—Armstrong, Westerman, Hattori, McLeland & Naughton

[57] ABSTRACT

An automatic article transport system capable of transporting a plurality of articles to respective destination positions within a short time and at high efficiency. The system includes a plurality of fixed rails, a plurality of movable rails each capable of running along a pair of fixed rails, and a plurality of hoists capable of running on the movable rails and of lifting and lowering a member to be transported. Controllers are installed on the movable rails and the hoists, respectively. The system further includes a central controller having a table and a device for generating a path for a member to be transported, and transmitters for transmitting control electric power and control signals between the central controller and the controllers installed on the movable rails and the hoists. A transport path for a member to be transported is determined in the path generating device on the basis of data on members to be transported, transport sequence data, and equipment and structure data.

4 Claims, 16 Drawing Sheets

FIG. 3

Go path table

Counter clockwise

| | | | | |
|---|---|---|---|---|
| #0 | | | | |
| #1 | 1 | 9 | | |
| #2 | 2 | | | |
| #3 | 3 | 8 | | |
| #4 | 4 | 7 | | |
| #5 | 5 | | | |
| #6 | 6 | | | |

Clockwise

| | | | | |
|---|---|---|---|---|
| #0 | | | | |
| #1 | 9 | 1 | | |
| #2 | 2 | | | |
| #3 | 8 | 3 | | |
| #4 | 7 | 4 | | |
| #5 | 5 | | | |
| #6 | 6 | | | |

Return path table

Counter clockwise

| | | | | |
|---|---|---|---|---|
| #6 | 6 | | | |
| #5 | f | e | 5 | |
| #4 | 7 | | | |
| #3 | 8 | | | |
| #2 | b | c | 2 | |
| #1 | 9 | | | |
| #0 | | | | |

Clockwise

| | | | | |
|---|---|---|---|---|
| #6 | 6 | | | |
| #5 | d | 5 | | |
| #4 | 4 | | | |
| #3 | 3 | | | |
| #2 | a | 2 | | |
| #1 | 1 | | | |
| #0 | | | | |

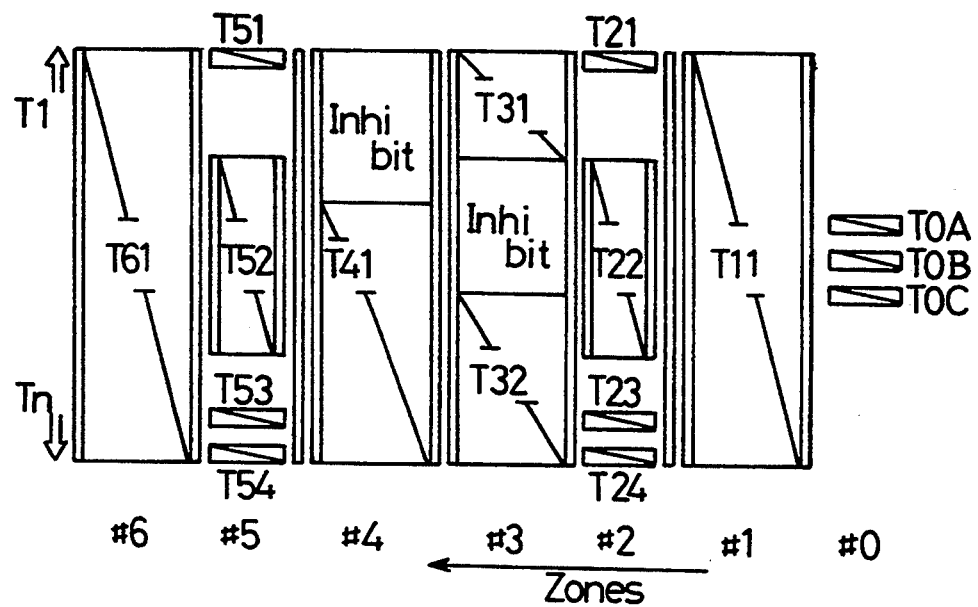

FIG. 5  Passable area connection table
+direction (gopath)

Clockwise

| | | | |
|---|---|---|---|
| T0A | T11 | | |
| T0B | T11 | | |
| T0C | T11 | | |
| T11 | T22 | T23☆ | T24☆ |
| ☆T21 | | | |
| T22 | T31 | T32 | |
| ☆T23 | T32 | | |
| ☆T24 | T32 | | |
| T31 | | | |
| T41 | T52 | T53☆ | T54☆ |
| ☆T51 | | | |
| T52 | T54 | | |
| ☆T53 | T61 | | |
| ☆T54 | T61 | | |
| T61 | | | |
| T32 | T41 | | |

Counterclockwise

| | | | |
|---|---|---|---|
| T0A | T11 | | |
| T0B | T11 | | |
| T0C | T11 | | |
| T11 | T21☆ | T22 | |
| ☆T21 | T31 | | |
| T22 | T31 | T32 | |
| ☆T23 | | | |
| ☆T24 | | | |
| T31 | | | |
| T41 | T51☆ | T52 | |
| ☆T51 | T61 | | |
| T52 | T61 | | |
| ☆T53 | | | |
| ☆T54 | | | |
| T61 | | | |
| T32 | T41 | | |

Order of priority →

-direction (returnpath)

Clockwise

| | | | |
|---|---|---|---|
| T0A | | | |
| T0B | | | |
| T0C | | | |
| T11 | T0A | T0B | T0C |
| ☆T21 | T11 | | |
| T22 | T11 | | |
| ☆T23 | | | |
| ☆T24 | | | |
| T31 | T21☆ | T22 | |
| T41 | T31 | | |
| ☆T51 | T41 | | |
| T52 | T41 | | |
| ☆T53 | | | |
| ☆T54 | | | |
| T61 | T51 | | |
| | | | |

Counterclockwise

| | | | |
|---|---|---|---|
| T0A | | | |
| T0B | | | |
| T0C | | | |
| T11 | T0A | T0B | T0C |
| ☆T21 | | | |
| T22 | T11 | | |
| ☆T23 | T11 | | |
| ☆T24 | T11 | | |
| T31 | T22 | T23☆ | T24☆ |
| T41 | T31 | | |
| ☆T51 | | | |
| T52 | T41 | | |
| ☆T53 | T41 | | |
| ☆T54 | T41 | | |
| T61 | T53☆ | T54☆ | |

☆ Fixed rail

Passable area connection overlap table

|  | T0A | | T0B | | T0C | | T11 | | T12 | | T21 | | T22 | |
|---|---|---|---|---|---|---|---|---|---|---|---|---|---|---|
|  | Upper Limit | Lower Limit | Upper Limit | Lower Limit | Upper Limit | Lower Limit | Upper Limit | Lower Limit | Upper Limit | Lower Limit | Upper Limit | Lower Limit | Upper Limit | Lower Limit |
| T0A | | | | | | | | | | | | | | |
| T0B | | | | | | | | | | | | | | |
| T0C | | | | | | | | | | | | | | |
| T11 | | | | | | | | | | | | | | |
| T21 | | | | | | | | | | | | | | |
| T22 | | | | | | | | | | | | | | |
| T23 | | | | | | | | | | | | | | |
| T24 | | | | | | | | | | | | | | |
| : | | | | | | | | | | | | | | |

FIG. 7

Rail working range table

Movable rail

| NO. | x 1 | y 1 | x 2 | y 2 |
|---|---|---|---|---|
| 1 | x11 | y11 | x12 | y12 |
| 2 | x21 | y21 | x22 | y22 |
| 3 | x31 | y31 | x32 | y32 |
| 4 | x41 | y41 | x42 | y42 |
| 5 | x51 | y51 | x52 | y52 |
| 6 | x61 | y61 | x62 | y62 |
| 7 | x71 | y71 | x72 | y72 |
| 8 | x81 | y81 | x82 | y82 |
| 9 | x91 | y91 | x92 | y92 |
|   |     |     |     |     |

Fixed rail

|   | x 1 | y 1 | x 2 | y 2 |     |
|---|---|---|---|---|---|
| a | x11 | y11 | x12 | y12 | T21 |
| b | x21 | y21 | x22 | y22 | T23 |
| c | x31 | y31 | x32 | y32 | T24 |
| d | x41 | y41 | x42 | y42 | T51 |
| e | x51 | y51 | x52 | y52 | T53 |
| f | x61 | y61 | x62 | y62 | T54 |
|   |     |     |     |     |     |
|   |     |     |     |     |     |
|   |     |     |     |     |     |
|   |     |     |     |     |     |

FIG. 8
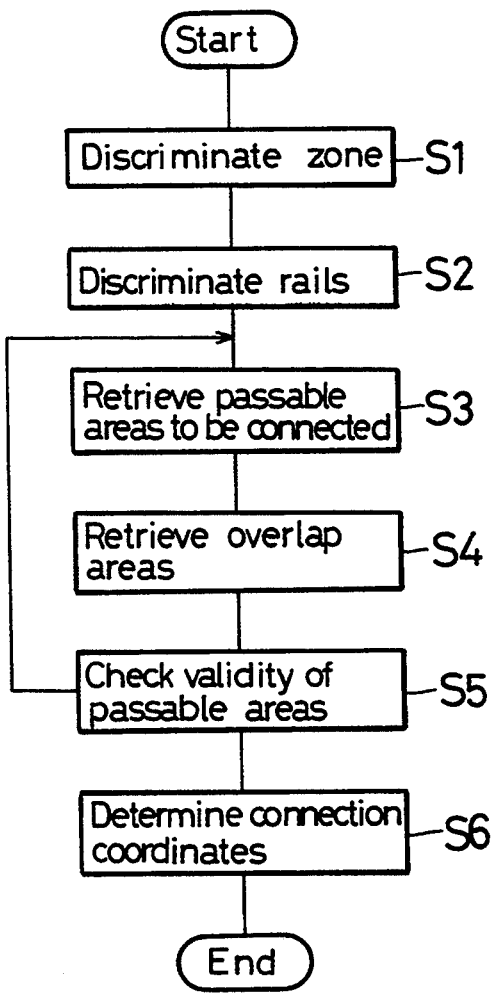
FIG. 9(A)
| | Present zone No. | | | | Final target zone No. |
| --- | --- | --- | --- | --- | --- |
| | #0 ──────────────────────────────────► #4 | | | | |
| Zone No. | #0 → | #1 → | #2 → | #3 → | #4 |
| Passable area No. | T0B → | T11 → | T22 → | T31 → | T41 |
| Rail No. | | 1 → | 2 → | 3 | |
FIG. 9(B)
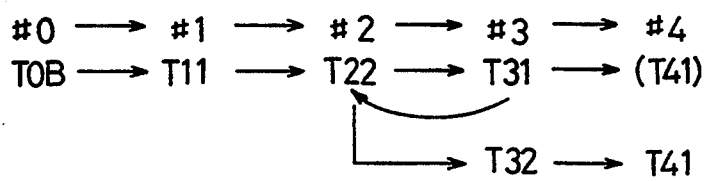

| Zone # | #0 | #1 | #2 | #3 | #4 |
|---|---|---|---|---|---|
| Pass area # | T0B | T11 | T22 | T32 | T41 |
| Rail # | | 1 | 2 | 3 | 4 |

FIG.12

Transported member data

| Transport zone # | No | x | y | z (Upper surface) |
|---|---|---|---|---|
| #1 | 1 | | | |
| | 2 | | | |
| | 3 | | | |
| | 4 | | | |
| | ⋮ | ⋮ | ⋮ | ⋮ |
| | i | | | |
| #2 | 1 | | | |
| | 2 | | | |
| | 3 | | | |
| | 4 | | | |
| | ⋮ | ⋮ | ⋮ | ⋮ |
| | i | | | |

FIG. 17(A)

| Zone # | 6 | 5 | 4 | 3 | 2 | 1 |
|---|---|---|---|---|---|---|
| Rotatable/Nonrotatable | 1 | 1 | 0 | 1 | 0 | 0 |

1 ··· Rotatable, 0 ··· Nonrotatable

| Zone # | 6 | 5 | 4 | 3 | 2 | 1 |
|---|---|---|---|---|---|---|
| Rotatable/Nonrotatable | 1 | 1 | 0 | 0 | 0 | 0 |

FIG. 17(B)

Before connection

After connection

AUTOMATIC ARTICLE TRANSPORT FOR BUILDING SYSTEM WITH CENTRALIZED ROUTING CONTROL

BACKGROUND OF THE INVENTION

The present invention relates to an automatic article transport system which is applicable to multi-storied building construction, dockyards, factories, physical distribution warehouses, etc.

There has heretofore been a known automatic article transport system in which rails are laid from a transport start position to a destination position, and an article as an object of transport is suspended from a transport device running on the rails, thereby allowing the article to be automatically transported to the destination position, as is seen in a part of a physical distribution warehouse or factory. However, it is difficult to employ such an automatic transport system for multi-storied building construction, dockyard, etc., since articles, e.g., materials, parts, etc., which are handled there, are large in terms of size and weight. Therefore, tower cranes or portal cranes are generally used at such places.

Incidentally, it has been apprehended in recent years that the term for completion may be delayed or quality may be degraded due to the shortage of skilled laborers. To solve this problem, various kinds of study and development have been made so as to enable a machine or a computer to perform operations which have heretofore depended on manual labor, thereby creating a safer and more comfortable working environment, shortening the construction period, ensuring stable quality and reducing the labor required for operation.

In the case of multi-storied building construction, for example, it has been considered to employ a system in which the highest floor, including the roof, is first constructed, and then the remaining floors are each constructed under control of a computer with the highest floor being lifted up successively, thereby completing the desired building. In this case, it is necessary at the production site on each floor to transport building materials, e.g., columns, beams, floors, exterior walls, etc., in a predetermined sequence and at high efficiency.

If the above-described automatic transport system is applied to the transport of such materials, since fixed rails are used for running a transport device, a large number of rails must be provided from a transport start position to a destination position. In addition, it is difficult to run a plurality of transport devices in a limited space.

SUMMARY OF THE INVENTION

In view of the above-described problems of the prior art, it is an object of the present invention to provide an automatic article transport system which is capable of automatically generating transport paths whereby a plurality of articles can be transported to respective destination positions within a short time and at high efficiency, and which is further capable of automatically transporting the articles along the transport paths.

Still other objects and advantages of the invention will in part be obvious and will in part be apparent from the specification.

To attain the above-described object, the present invention provides an automatic article transport system including a plurality of fixed rails, a plurality of movable rails each capable of running along a pair of fixed rails, and a plurality of hoists capable of running on the movable rails and of lifting and lowering a member to be transported. Controllers are installed on the movable rails and the hoists, respectively. The system further includes a central controller having a table and means for generating a path for a member to be transported, and transmitters for transmitting control electric power and control signals between the central controller and the controllers installed on the movable rails and hoists. A transport path for a member to be transported is determined in the path generating means on the basis of data on members to be transported, transport sequence data, and equipment and structure data.

In addition, the present invention provides an automatic article transport system including a loading floor and a working floor installed above the loading floor, and a vertical transport device provided in between the loading and working floors. A plurality of fixed rails are provided on each of the loading and working floors and vertical transport device. A plurality of movable rails are provided on the loading and working floors. Each movable rail is capable of running along a pair of fixed rails. The system further includes a plurality of hoists capable of running on the movable rails and of lifting and lowering a member to be transported. Controllers are installed on the movable rails, the hoists and the vertical transport device, respectively. In addition, the system includes a central controller having a table and means for generating a path for a member to be transported, and transmitters for transmitting control electric power and control signals between the central controller and the controllers installed on the movable rails, the hoists and the vertical transport device. A transport path for a member to be transported is determined in the path generating means on the basis of data on members to be transported, transport sequence data, and equipment and structure data. This system may be applied to a multi-storied building construction system in which the working floor is successively lifted up by a hydraulic lift-up apparatus.

In the present invention, the path generating table includes a zone discriminating table for discriminating zones divided along a plurality of fixed rails, a go and return path rail table showing rails usable for go and return paths in each of the zones, a passable area table showing areas allowing a hoist to pass in each of the zones, a passable area connection table listing, among passable areas in each pair of adjacent zones, those which are connected to each other, a passable area connection overlap table prepared by discriminating coordinates of overlapping areas from the passable area connection table, and a rail working range table to which coordinates of respective working ranges of the movable rails are input. The path generating means compares the coordinates of the overlapping areas with the coordinates of the rail working ranges, and if an overlapping area is within the corresponding rail working range, the path generating means judges the relevant pass areas to be valid and then determines connection coordinates.

According to the present invention, it is possible to generate automatically transport paths whereby a plurality of articles can be transported to respective destination positions within a short time and at high efficiency and also possible to transport automatically the articles along the transport paths.

BRIEF DESCRIPTION OF THE DRAWINGS

FIG. 3 shows go and return path rail tables.

FIG. 4 shows a passable area table.

FIG. 5 shows passable area connection tables.

FIG. 7 shows rail working range tables.

FIG. 8 is a flowchart showing path generating processing in the present invention.

FIGS. 9(A)-(B) show retrieval of pass areas to be connected.

FIG. 12 shows a transported member table.

FIGS. 17(A)-(B) show a rotatable area table.

DESCRIPTION OF THE PREFERRED EMBODIMENTS

One embodiment of the present invention will be described below with reference to the accompanying drawings. Although in the following description the automatic article transport system of the present invention will be explained by way of one example in which it is applied to multi-storied building construction, it should be noted that the present invention is not necessarily limitative thereto and that it is also applicable to automatic article transport systems used in dockyards, factories, physical distribution warehouses, etc.

Figure 18:
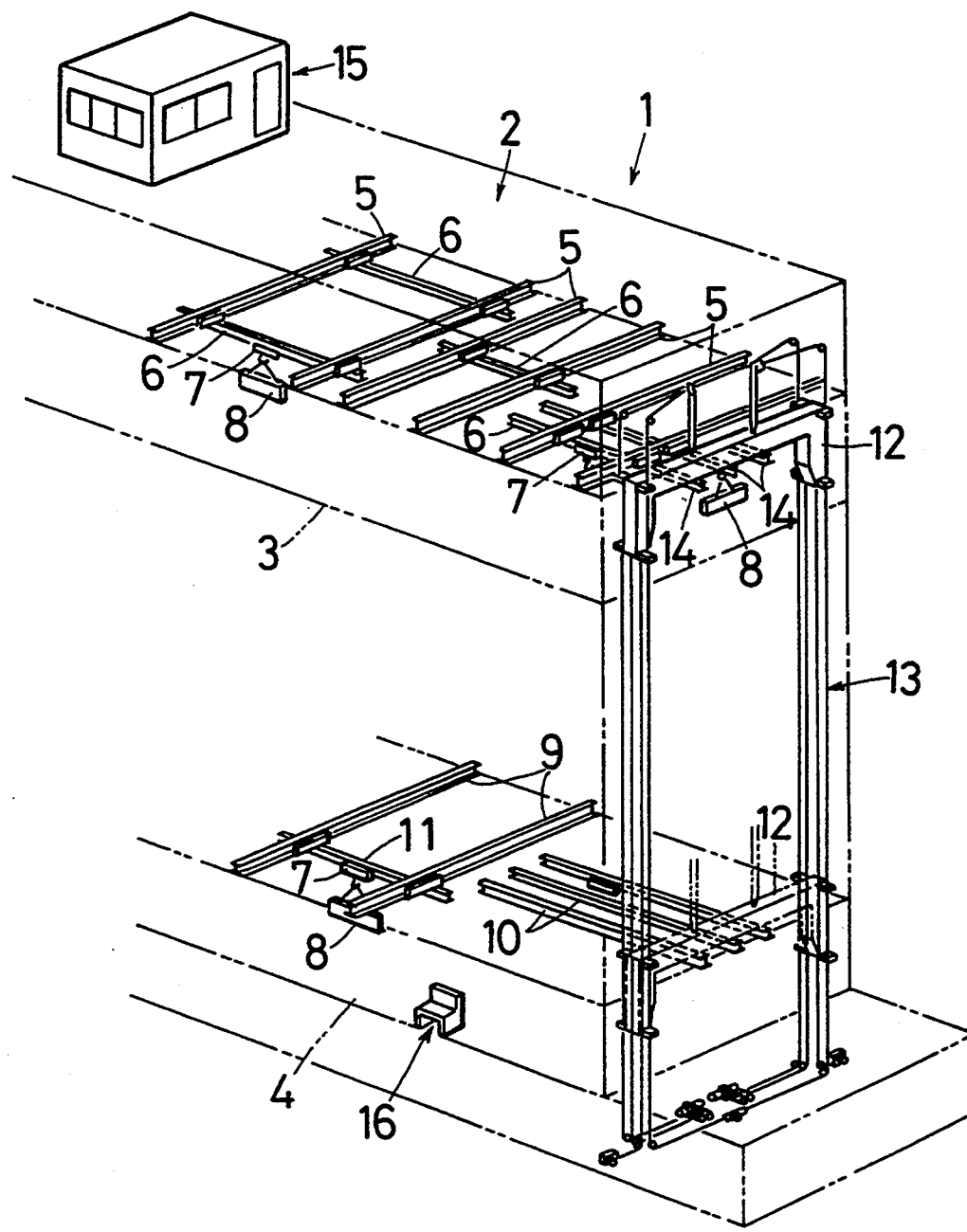
FIG. 18 is a perspective view schematically showing one embodiment of the automatic article transport system according to the present invention.

FIG. 18 is a perspective view schematically showing a multi-storied building construction system to which the automatic article transport system of the present invention is applied. In the multi-storied building construction system shown in FIG. 18, an upper construction plant 2 is first built on the highest floor of a multi-storied building 1, and various kinds of building material such as columns, beams, floors, exterior walls, etc. are delivered to a working floor 3 of the upper construction plant 2 from a loading floor 4 on the ground. After the building materials have been assembled to produce a floor structure for one floor, the upper construction plant 2 itself is raised by a hydraulic lift-up apparatus and columns 17. In this way, floor structures for higher floors are produced successively. Since the whole upper construction plant 2 is covered with a roof, there is no likelihood of the term for completion being delayed due to bad weather, and it is also possible to obtain a safe and comfortable working environment.

On the ceiling of the working floor 3 are disposed a plurality of fixed rails 5, movable rails 6 each capable of running along a pair of fixed rails 5, and hoists 7 that move along the movable rails 6. Building materials 8 to be transported are suspended from the hoists 7. On the ceiling of the loading floor 4 are disposed a plurality of fixed rails 9 and 10, and movable rails 11 each capable of running along a pair of fixed rails 9. The hoists 7 run along the movable rails 11 and the fixed rails 10.

Between the working floor 3 and the loading floor 4, vertical transport devices 12 are installed so as to be movable up and down between these two floors by being guided by wire ropes 13. On the ceiling of each vertical transport device are installed fixed rails 14 for receiving a hoist 7. An operator room 15 is provided on the roof floor of the working floor 3, and a control board 16 is provided on the loading floor 4. In this system, each hoist 7 is automatically controlled from the time when slinging of a member 8 to be transported has been completed on the loading floor 4 until it reaches a given place on the working floor 3. After the operator has set the transported member 8 by executing lowering, unslinging and lifting, the hoist 7 is automatically returned to the loading floor 4.

Figure 19A:
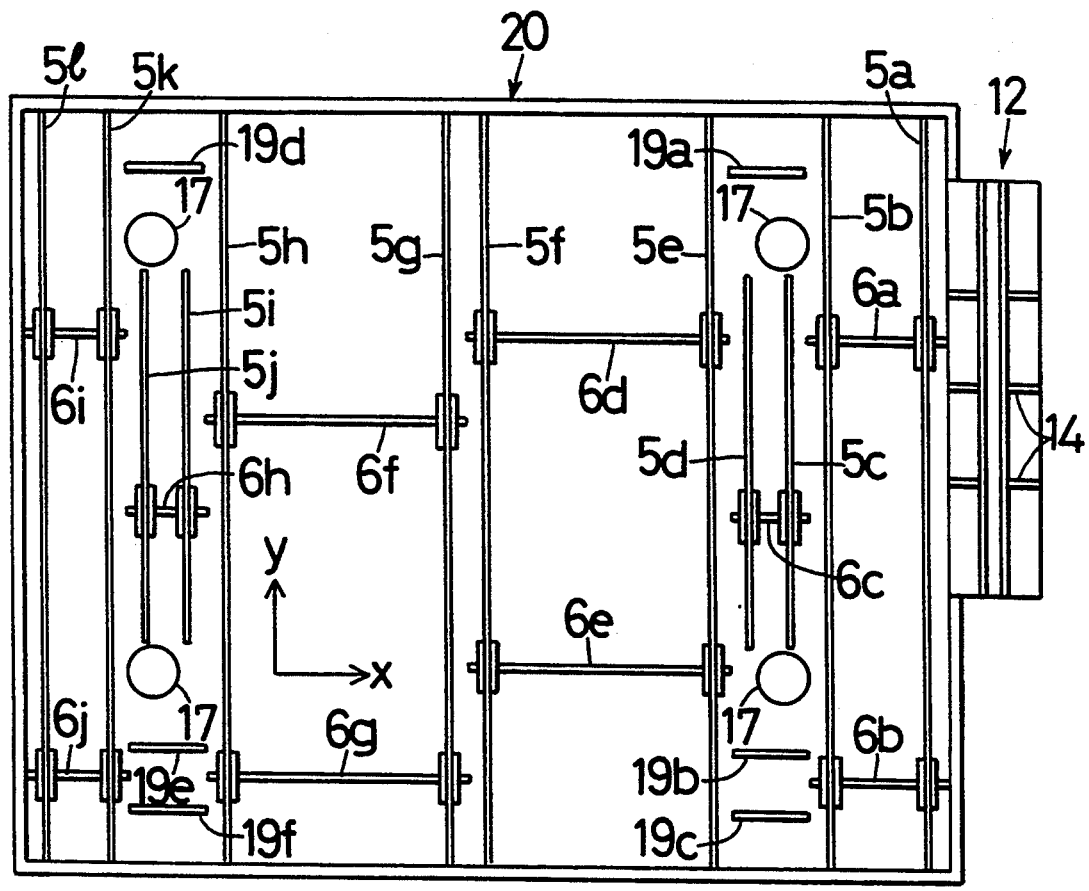
FIGS. 19(A)-(B) show one example of the layout of fixed and movable rails on a working floor shown in FIG. 18.
Figure 19B:
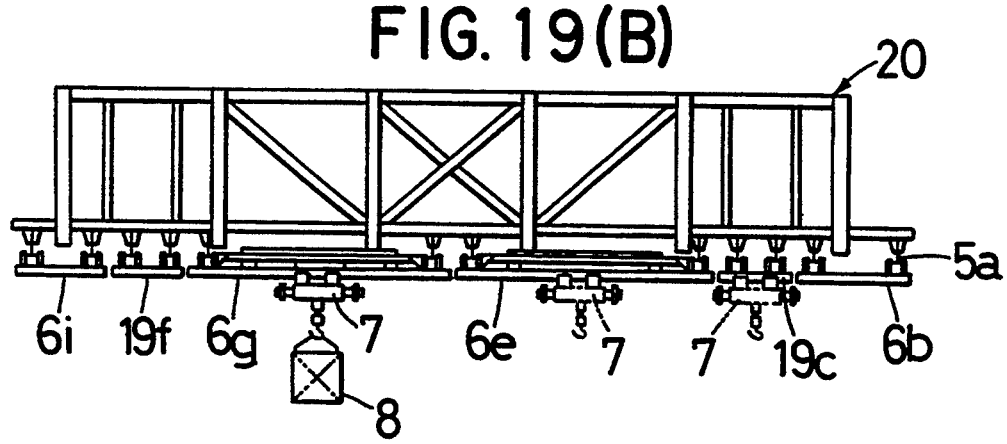

FIG. 19 shows one example of the layout of the fixed and movable rails 5 and 6 on the working floor 3. FIG. 19A is a plan view, and FIG. 19B is a side view. The upper construction plant 2 has a frame 20 on which are installed fixed rails 5a, 5b, ..., 5k and 5l, which are spaced in a direction x. Further, movable rails 6a, 6b, ..., 6i and 6j are installed on the frame 20 so as to be movable in a direction y. The movable rails 6a, 6b, ..., 6i and 6j are each disposed between a pair of fixed rails (e.g., 5a and 5b). In this embodiment, fixed rails 19a, 19b, ..., 19f, which are spaced in the y-direction, are additionally installed because the length of the fixed rails 5c, 5d, 5i and 5j is limited owing to the need to provide supporting columns 17 for lifting up the upper construction plant 2. However, in a case where such supporting columns 17 are not provided, the arrangement may be such that the fixed rails 19a, 19b, ..., 19f are eliminated, but the fixed rails 5c, 5d, 5i and 5j are extended instead, and the number of movable rails 6c and 6h is increased.

As shown in FIG. 19B, the above-described hoist 7 is movably attached to the movable rails 6. For example, if the movable rails 6b, 6e, 6g and 6j and the fixed rails 19c and 19f are formed in a straight line, the hoist 7 can run over the entire lateral range along the x-axis to transport the material 8.

Figure 20:
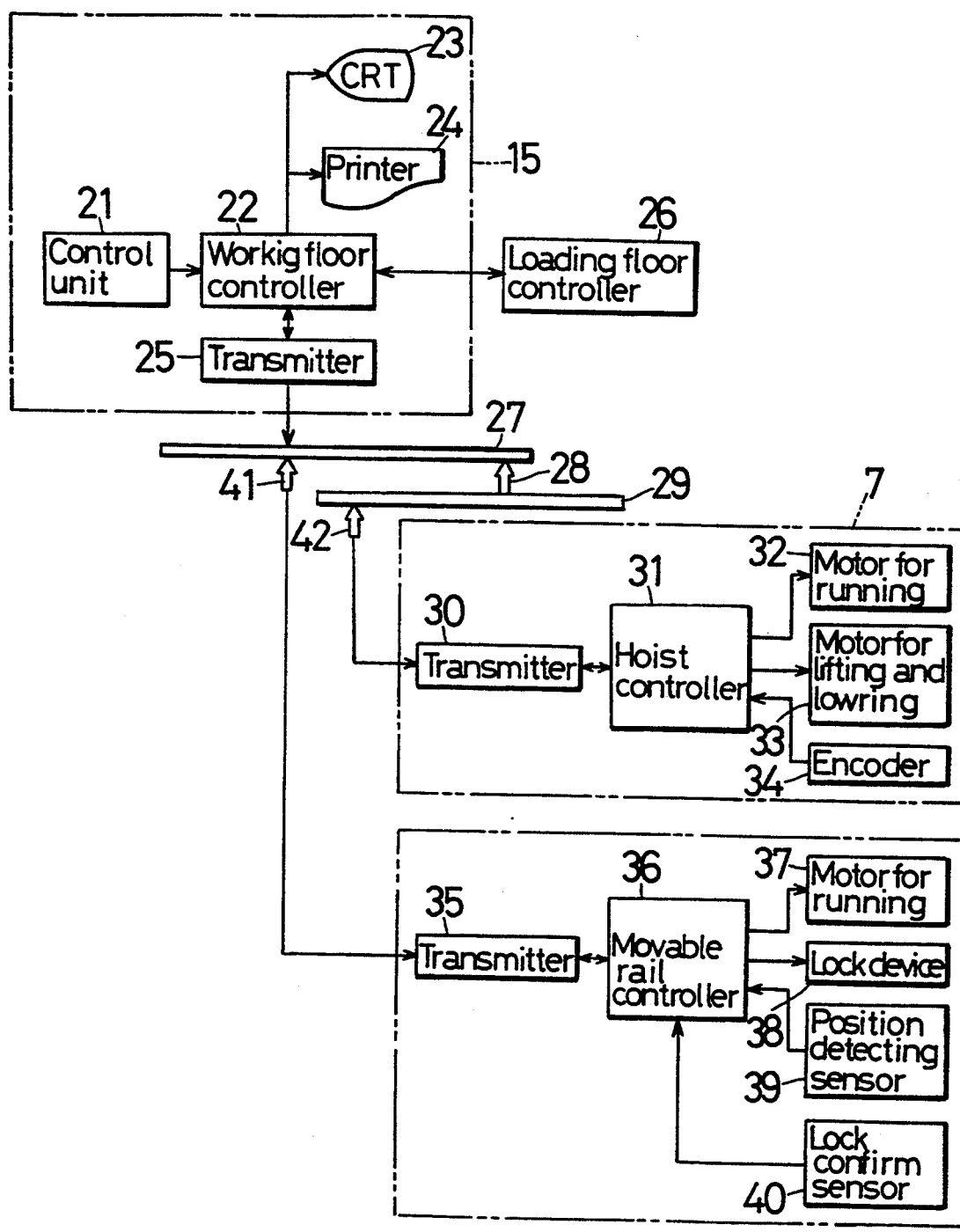
FIG. 20 is a block diagram of a control system employed in the automatic article transport system shown in FIG. 18.

FIG. 20 is a block diagram of a control system used in the above-described automatic article transport system. The control system in this embodiment has functions of transporting hoists horizontally and vertically at both the working and loading floors and of lifting up the working floor, together with control functions for the movement of hoists, the movement of vertical transport devices, prevention of collision, sensing, etc. Further, the control system monitors transport conditions for each kind of member to be transported and for each hoist, transfers information on a member transport sequence matched with the erection condition by data communication, and displays as well as records the transport sequence and the result. In addition, the control system simulates a member transport route, instructs the relevant hoist of the result of the simulation and, at the same time, displays the result. Transmission of control signals to hoists and movable rails is carried out by using trolley wires for control power supply in common. It should be noted that in FIG. 20 illustration of the control of the hoists 7 and the movable rails 11 on the loading floor 4 and the control of the vertical transport devices 12 is omitted.

The operator room 15 on the working floor 3 is provided with a control unit 21, a working floor controller 22 as a central controller, a CRT 23, a printer 24, and a transmitter 25. The working floor controller 22 is connected to a loading floor controller 26 provided on the loading floor 4. The transmitter 25 is connected to a trolley feeder line 27 for movable rails and further connected to a trolley feeder line 29 for hoists through a collector 28.

Each hoist 7 is provided with a transmitter 30, a hoist controller 31, a motor 32 for running, a motor 33 for lifting and lowering, and an encoder 34 for detecting the position of rotation of each of these motors. Each movable rail 6 is provided with a transmitter 35, a movable rail controller 36, a motor 37 for running, a lock device 38, a position detecting sensor 39 for detecting the position of the movable rail, and a lock confirm sensor 40. The transmitters 30 and 35 are connected to the trolley feeder lines 27 and 29 through collectors 41 and 42, respectively.

Figure 21A:
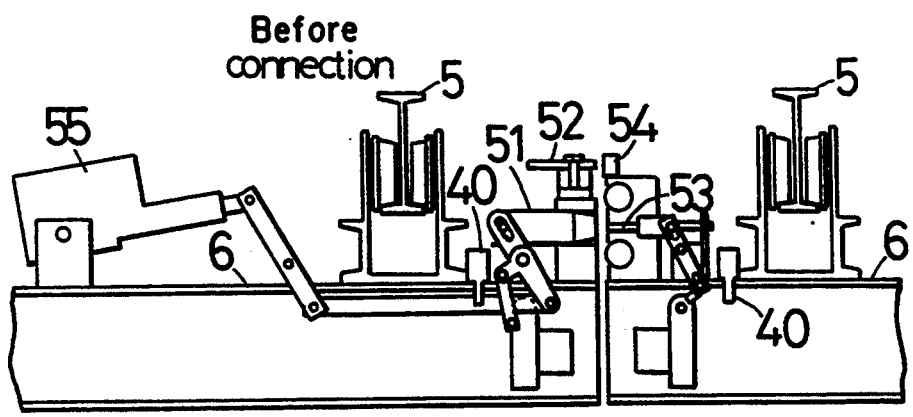
FIGS. 21(A)-(B) are a side view showing a mechanism for locking movable rails.
Figure 21B:
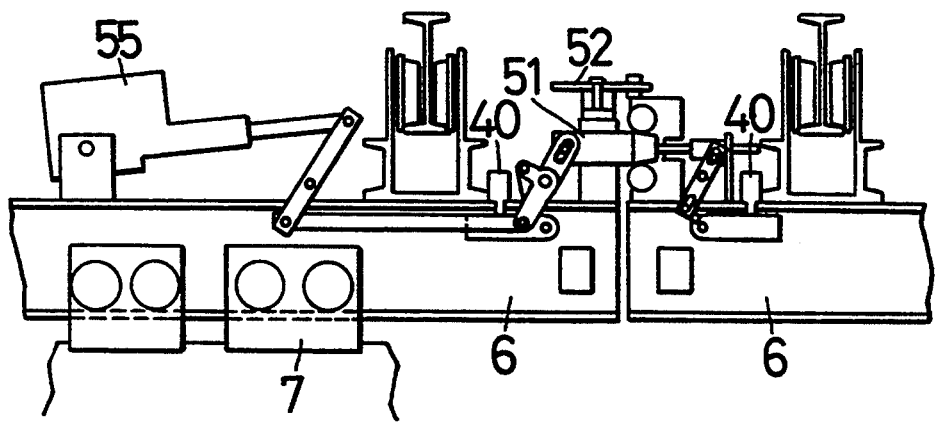

FIG. 21 shows a mechanism for locking together a pair of movable rails 6. The lock device 38 includes a vertical lock pin 51 and a horizontal lock lever 52, which are provided on one movable rail 6, and an engagement hole 53 that is provided on the other movable rail 6 and engaged with the vertical lock pin 51, and a latch pin 54 that is provided on the second movable rail 6 and latched by the horizontal lock lever 52. By driving an actuator 55, the two movable rails 6 are locked to each other by the vertical lock pin 51 and the horizontal lock lever 52, as shown in FIG. 21B. In addition, the lock is confirmed by the lock confirm sensor 40.

Figure 1:
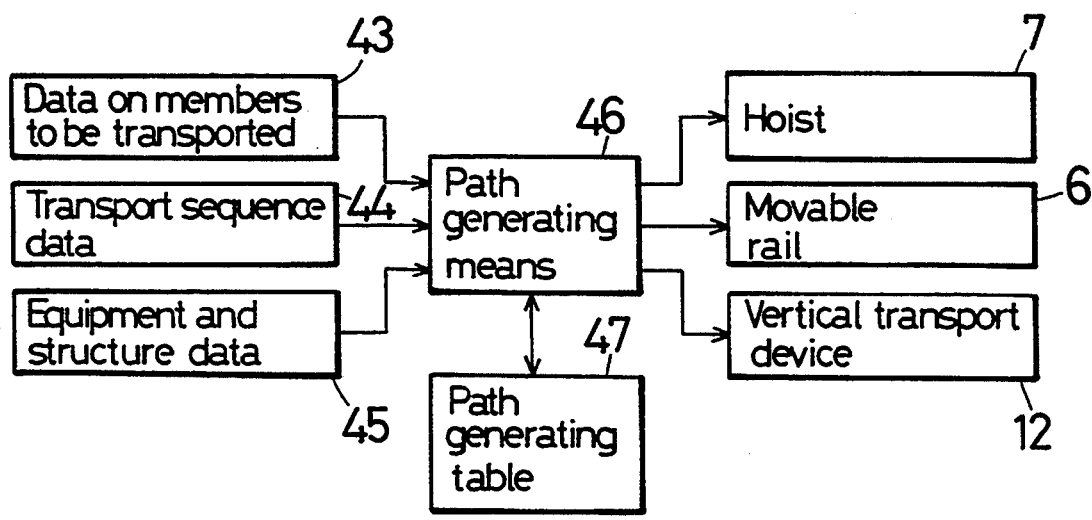
FIG. 1 shows the contents of processing executed in the automatic article transport system according to the present invention.

FIG. 1 shows the contents of processing executed in the above-described control system, which features the present invention. In a path generating means 46, a route for transporting a member to be transported is determined with reference to a path generating table 47 and on the basis of data 43 on the configurations of various kinds of member to be transported, e.g., columns, beams, external walls, etc., transport sequence data 44, which is data on sequences in which transported members are to be built, and equipment and structure data 45, which is data on building structures. Then, the control system sends instructions to a hoist 7, movable rails 6 and a vertical transport device 12.

The path generating table 47 is stored with various kinds of tables prepared for generating a path. This processing will be explained below.

Figure 2:
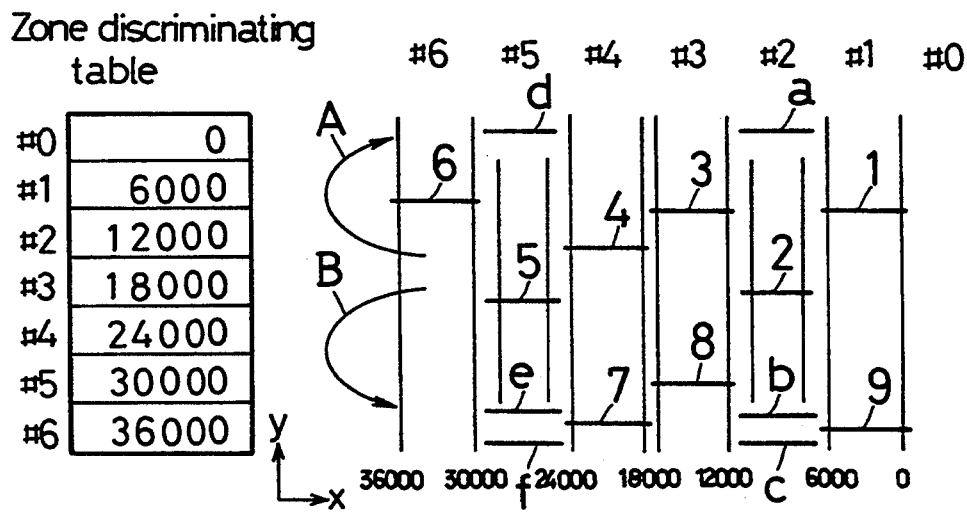
FIG. 2 shows a zone discriminating table.

FIG. 2 shows a zone discriminating table. As shown in the figure, the working floor is divided into 7 zones #0 to #6 along the fixed rails which are spaced in the x-axis direction, and addresses are assigned to boundaries between the zones. With this zone discriminating table, the present position of a hoist and the final target zone are discriminated. The numerals 1 to 9 in the figure represent the Nos. of the movable rails, and the symbols a to f represent Nos. of the fixed rails which are spaced in the y-axis direction.

FIG. 3 shows go and return path rail tables. Rails which are usable for the go path and/or the return path in each zone are listed for each direction of rotation, thereby preparing go and return path rail tables. More specifically, the order of priority is previously set for the rails such that if transport is to be made counterclockwise, i.e., in the direction B, for example, in FIG. 2, the hoist concerned is moved in the sequence, the rail Nos. 1, 2, 3, 4, 5, 6, f, 7, 8, b and 9, and if the rail No. 1 is being used for another transport operation in the zone #1, the rail No. 9 is used instead.

FIG. 4 shows a passable area table showing an area that enables a hoist to pass in each zone. The passable area table is prepared on the basis of data on inhibit areas. Inhibit areas are changed with time for a welding operation, an observation trip course, etc., and hence set on each occasion. It should be noted that the symbols TOA, TOB and TOC represent fixed rails for vertical transport devices.

FIG. 5 shows passable area connection tables. Among passable areas in each pair of adjacent zones, those which are connected to each other are listed for each of the + and − directions (go and return paths) and for each of the clockwise and counterclockwise directions, thereby preparing passable area connection tables. For example, for the clockwise transport along the go path, the area T11 is preferentially connected to the areas T22, T23 and T24 in the mentioned order. The area T21 is employed for the return path, and it is not used for the go path. The area T22 is connected to only the areas T31 and T32 because there is an inhibit area.

Figures 6A, 6B:
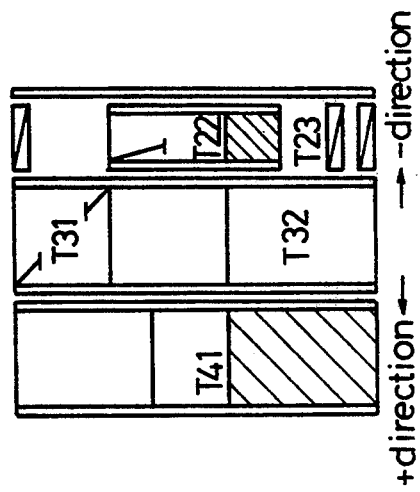
FIGS. 6(A)-(B) show a passable area connection overlap table.

FIG. 6 shows a passable area connection overlap table, which is prepared by discriminating overlap coordinates from the data shown in the passable area connection tables of FIG. 5, as shown in FIG. 6B. The passable area connection overlap table is also prepared for each of the + and − directions (go and return paths) and for each of the clockwise and counterclockwise directions.

FIG. 7 shows rail working range tables, to which coordinates representative of the working ranges of the movable and fixed rails are input.

FIG. 8 is a flowchart showing path generating processing executed in the path generating means 46, shown in FIG. 1. First, at step S1, the present zone No. and the final target zone No. are discriminated on the basis of the coordinates of the present hoist position and the final target position by using the zone discriminating table, shown in FIG. 2. At step S2, usable rails are discriminated from the data shown in the go and return path rail tables, shown in FIG. 3.

At step S3, passable areas which can be used from the present zone to the final target zone are selected by using the passable area connection tables, shown in FIG. 5, with the rotation direction taken into consideration. This process will be explained with reference to FIGS. 4 to 9. It is assumed that the present zone No. is #0, the final target zone No. is #4, and passable area Nos. and rail Nos are set as shown in FIG. 9A. In this case, it is revealed as a result of the retrieval that the area T22 cannot be connected to the area T31. Therefore, the process returns to the zone #2 to retrieve an area in the zone #3, exclusive of T31, which can be connected to the area T11 through an area in the zone #2, that is, the area T32, as shown in FIG. 9B.

Next, at step S4, retrieval of overlap areas is executed by using the passage area connection overlap table, shown in FIG. 6. Thus, zone Nos., pass area Nos., and Nos. of rails to be used are determined, as shown in FIG. 10, and connection coordinates are set from these pieces of data.

Next, the determined pass areas are checked for validity at step S5. The validity check is made as follows. When the pass areas are set, as shown in FIG. 10, the coordinates of each overlap area and the coordinates of the corresponding rail working range, shown in FIG. 7, are compared to judge whether or not the overlap area is within the rail working range. If the overlap area is judged to be outside the rail working range, transport cannot proceed to the next pass area. Therefore, selection of pass areas is made again. If the overlap areas are within the rail working ranges, the pass areas are judged to be valid. Then, connection coordinates are determined at step S6.

Figures 10, 11:
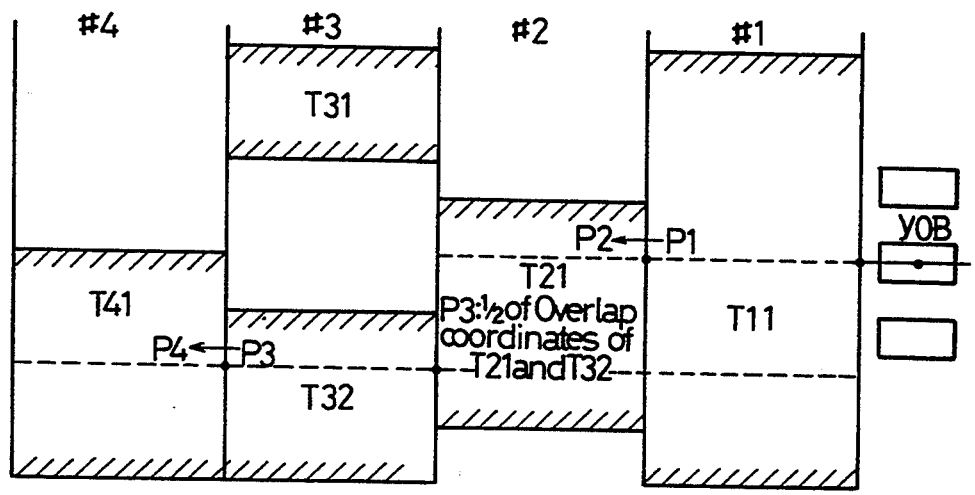
FIG. 10 shows results of retrieval of overlapping areas.
FIG. 11 shows a method of determining connection coordinates.

FIG. 11 shows a method of determining connection coordinates. First, the center coordinate yOB of a vertical transport device is defined as the travel destination coordinate P1 of a rail in the zone #1. Then, it is checked whether or not P1 is within the range of overlap coordinates of the areas T11 and T21. Since P1 is within the overlap coordinate range, P2 is substituted for P1. Then, it is checked whether or not P2 is within the range of the overlap coordinates of the areas T21 and T32. Since P2 is outside the range, the coordinate of ½ of the range of overlap coordinates of T21 and T32 is defined as P3. Then, it is checked whether or not P3 is within the range of the overlap coordinates of the areas T32 and T41. Since P3 is within the range, P4 is substituted for P3. The reason why transport is made linearly as much as possible by minimizing movement of movable rails as described above is that if movable rails are moved, it takes time to lock them.

The foregoing is the description of path generation, which features the present invention. In the case of multi-storied building construction, however, it is necessary to rotate a member, e.g., a beam, external wall, etc., to a desired installation position when it is transported to the target position. The following is a description of processing for determining a rotation position of a member being transported.

First, as data on transported members, x- and y-coordinates are used, and the upper surfaces of members after installation are represented by z-coordinates, as shown in FIG. 12.

Figure 13:
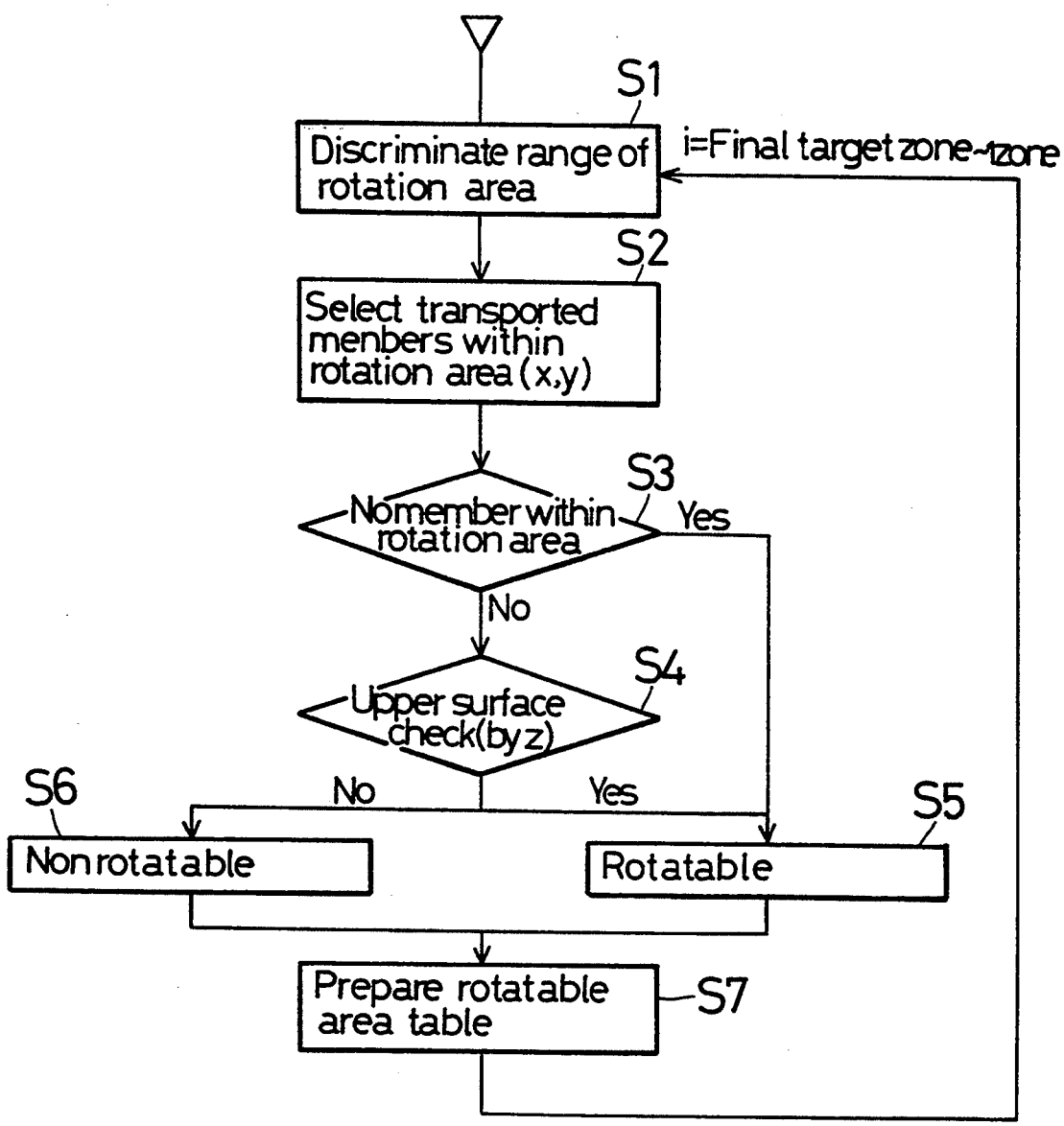
FIG. 13 is a flowchart showing processing for determining a rotation position of a member to be transported.
Figure 14:
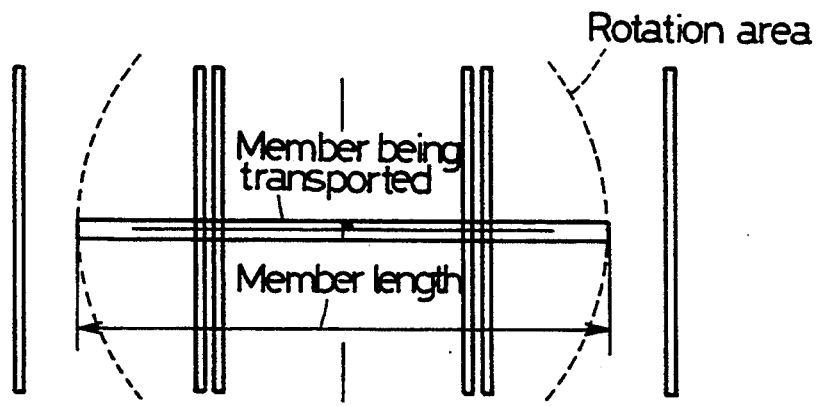
FIG. 14 shows discrimination of the range of a rotation area.
Figure 15:
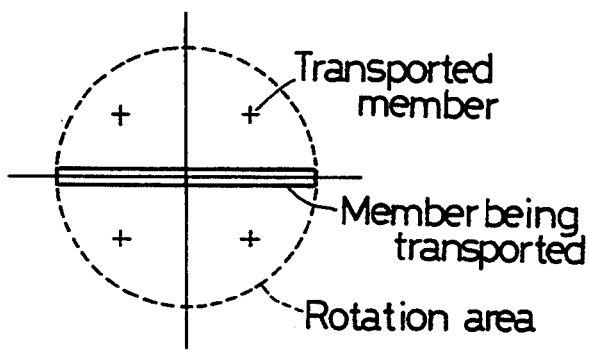
FIG. 15 shows selection of transported members within the range of a rotation area.
Figure 16:
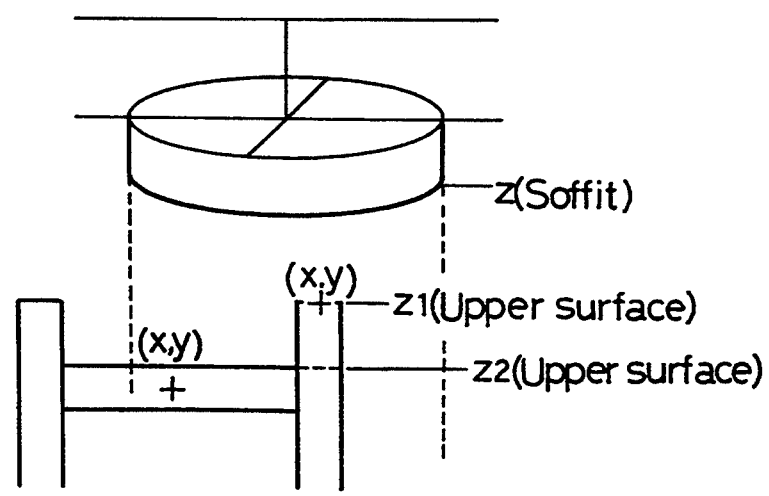
FIG. 16 shows upper surface check processing.

FIG. 13 is a flowchart showing processing for determining a rotation position of a member being transported. First, the range of a rotation area is discriminated at step S1. This is done because a member being transported is rotated in the center of a zone #i, as shown in FIG. 14, and therefore zones #n which are within the rotation area must be checked.

Next, at step S2, transported members which are within the rotation area are selected from those in the zones #n, which are recorded in the transported member table (see FIG. 12). If there is no transported member within the rotation area (step S3), then it is decided at step S5 that rotation can be effected. If there is a transported member within the rotation area, upper surface check processing is executed at step S4. More specifically, the z-coordinate of the upper surface of the transported member and the z-coordinate of the soffit of the member being transported are compared with each other. If there is no upper surface $z_i$ which is equal to or higher than the soffit z of the member being transported, it is decided that the member being transported can be rotated in the zone #i. Then, a rotatable area table is prepared at step S7, as shown in FIG. 1. In FIG. 17A, rotation can be made in the final target zones #6, #5 and #3, but rotation cannot be effected in the zone #4. Therefore, if the member being transported proceeds to #4 after being rotated in #3, it may collide with a transported member in #4. Accordingly, rotation in #3 is prevented, and the rotatable area table is corrected, as shown in FIG. 17B.

What is claimed is:

1. An automatic article transport system for building a structure comprising:

fixed rails horizontally provided on a building;

a plurality of movable rails mounted between said fixed rails and each capable of running along said fixed rails;

a plurality of hoists capable of running on said movable rails and of lifting and lowering a member to be transported;

controllers installed on said movable rails and hoists, respectively;

a central controller having a table and means for generating a path for a member to be transported; and transmitters for transmitting control electric power and control signals between said central controller and said controllers installed on said movable rails and hoists, wherein a transport path for a member to be transported is determined in said path generating means on the basis of data on members to be transported relating to configuration of various types of members, transport sequence data relating to a building sequence of said members and equipment and structure data relating to the structure to be built, and said movable rails are moved and said hoists are run according to said transport path.

2. An automatic article transport system for building a structure comprising:

a loading floor and a working floor installed above said loading floor;

a vertical transport device provided in between said loading and working floors;

fixed rails provided on each of said loading and working floors;

a plurality of movable rails provided in between said fixed rails on said loading and working floors and each capable of running along said fixed rails;

a plurality of hoists capable of running on said movable rails and of lifting and lowering a member to be transported;

controllers installed on said movable rails, said hoists and said vertical transport device, respectively;

a central controller having a table and means for generating a path for a member to be transported; and transmitters for transmitting control electric power and control signals between said central controller and said controllers installed on said movable rails, said hoists and said vertical transport device, wherein a transport path for a member to be transported is determined in said path generating means on the basis of data on members to be transported relating to configuration of various types of members, transport sequence data relating to a building sequence of said members, and equipment and structure data relating to the structure to be built and said movable rails are moved and said hoists are run according to said transport path.

3. An automatic article transport system according to claim 2, which is a multi-storied building construction system in which said working floor is successively lifted up by a hydraulic lift-up apparatus.

4. An automatic article transport system according to claim 1 or 2, wherein said path generating table includes a zone discriminating table for discriminating zones divided along said plurality of fixed rails, a go and return path rail table showing which rails of said plurality of movable rails are usable for go and return paths in each of said zones, a passable area table showing areas allowing a hoist of said plurality of hoists to pass in each of said zones, a passable area connection table listing, among passable areas in each pair of adjacent zones, those which are connected to each other, a passable area connection overlap table prepared by discriminating coordinates of overlapping areas from said passable area connection table, and a rail working range table to which coordinates of respective working ranges of said movable rails are input, and said path generating means for comparing the coordinates of said overlapping areas with the coordinates of said rail working ranges such that if an overlapping area is within the corresponding rail working range, said path generating means judges the relevant pass areas to be valid and then determines connection coordinates.

* * * * *